(12) United States Patent
Piesinger

(10) Patent No.: US 6,922,145 B2
(45) Date of Patent: Jul. 26, 2005

(54) INTRUSION DETECTION, TRACKING, AND IDENTIFICATION METHOD AND APPARATUS

(76) Inventor: Gregory Hubert Piesinger, 6225 E. Saguaro Vista Ct., Cave Creek, AZ (US) 85331

( * ) Notice: Subject to any disclaimer, the term of this patent is extended or adjusted under 35 U.S.C. 154(b) by 62 days.

(21) Appl. No.: 10/445,436

(22) Filed: May 27, 2003

(65) Prior Publication Data

US 2003/0222778 A1 Dec. 4, 2003

Related U.S. Application Data

(60) Provisional application No. 60/383,923, filed on May 29, 2002.

(51) Int. Cl.[7] .............................................. G08B 13/00
(52) U.S. Cl. ...................... 340/541; 340/554; 340/555; 340/556; 340/557; 340/506
(58) Field of Search ................................ 340/541, 554, 340/555, 556, 557, 506, 825, 825.49

(56) References Cited

U.S. PATENT DOCUMENTS

| | | | | |
|---|---|---|---|---|
| 3,793,617 A | * | 2/1974 | Tolman | 367/93 |
| 3,952,280 A | | 4/1976 | Altes | |
| 4,051,472 A | * | 9/1977 | Albanese et al. | 342/28 |
| 4,084,148 A | * | 4/1978 | Koshikawa | 367/93 |
| 4,527,151 A | * | 7/1985 | Byrne | 340/554 |
| 5,641,963 A | * | 6/1997 | Mueller | 250/342 |
| 5,786,760 A | * | 7/1998 | Suzuki et al. | 340/541 |
| 5,973,996 A | * | 10/1999 | Zhevelev et al. | 367/99 |

* cited by examiner

Primary Examiner—Hung Nguyen

(57) ABSTRACT

Overlapping range rings from a pair of non-scanning radar or sonar transducers creates a grid structure within a surveillance area defined by their overlapping beam widths. Using PN coded transmission signals and doppler signal processing, intruder targets are detected, located, and tracked as they move throughout the grid structure. Intruders are identified by comparing their movement pattern to those of known intruders. Three dimensional surveillance areas can be monitored using three or more transducer sites.

20 Claims, 8 Drawing Sheets

INTRUSION DETECTION, TRACKING, AND IDENTIFICATION METHOD AND APPARATUS

RELATED INVENTION

The present invention claims priority under 35 U.S.C. §119(e) to: "Intrusion Detection, Tracking, and Identification Method and Apparatus," Provisional U.S. patent application Ser. No. 60/383,923, filed 29 May 2002, which is incorporated by reference herein.

TECHNICAL FIELD OF THE INVENTION

The present invention relates to the field of intruder detection. More specifically, the present invention relates to the field of detecting, tracking, and identifying an intruder's entry into a monitored area.

BACKGROUND OF THE INVENTION

Intrusion detection devices are used in a large variety of industrial and security applications. Many different techniques are used of which most are based on specific applications of microwave, radar, optical, acoustic, sonar, or ultrasonic technologies. Typical industrial applications include automatic door openers, detection of goods on an assembly conveyor, and devices that turn on lights upon entering a room. Typical security applications include sensors to detect the presence of unauthorized individuals or vehicles in a specific area.

Many intrusion detection applications can be solved using simple devices and methods such as interrupting a light beam or incorporating motion detectors based on optical or microwave techniques. However, there are other applications in which it is desired to track the intruder or identify the type of intruder once it enters the surveillance area. It is these types of applications that are targeted by this invention.

Tracking the location of an intruder is much more difficult than simply detecting its presence. Whereas simply flooding an area with a microwave, optical, or ultrasonic beam and detecting the doppler frequency shift due to intruder movement works good for detecting the presence of an intruder, this simple technique cannot be used to pinpoint its location or identify the type of intruder.

To track an intruder, a video camera or some type of scanning system such as radar is typically required. Cameras cannot be used when the optical clarity of the area is poor such as in fog or in underwater applications. In scanning systems, large mechanical scanning antennas or phased arrays are typically required to obtain the narrow beam widths needed for high directional sensitivity.

Although the present invention could be applied to many different intrusion applications, the method and apparatus to be described in this disclosure was motivated by the desire to detect the intrusion of sharks into a swimming area such as a public beach.

The incidence of shark attacks on swimmers has increased over the years as more and more people seek recreation at beaches around the world. Although attacks are still rare, they almost always cause serious injury or death. Therefore, it would be beneficial to municipalities, hotels, and resorts to have the capability of detecting the presence of sharks and alerting swimmers whenever they entered the swimming area.

For this intrusion application, both the location and identification of the intruder are required. Since large fish, dolphins, sea lions, and the like may also be present in waters frequented by sharks, a means of discriminating between these different types of intruders is also required. Optical (camera) techniques cannot be used because of poor water clarity at most beaches and low ambient lighting at all beaches at night. Large scanning or phased array sonar systems could be used but their cost would most likely be prohibitive.

Altes in U.S. Pat. No. 3,952,280 describes a sonar technique in which an area is illuminated with broad band radiation and the reflected signal is passed through various filters in an attempt to discriminate between various targets. The location of the target is not indicated and it is highly unlikely that this system could discriminate between similar size objects such as sharks and dolphins.

Accordingly, it is the object of the present invention to provide a new and improved method, of detecting, tracking, and identifying intruders into an area under surveillance.

SUMMARY OF THE INVENTION

Briefly, to achieve the desired object of the present invention, a series of ultrasonic transducers will be placed underwater offshore just beyond the swimming area and parallel to the beach being protected. The transducer sites will be separated from each other on the order of a thousand feet and each site will contain a transducer capable of both transmitting and receiving. The transducers will have a hemispherical azimuth beam width pointed away from the beach. As such, the array of transducers acts as a widely spaced "picket fence" which monitors the waters outside the swimming area.

Signals from each adjacent pair of transducer sites will be processed together such that their combined coverage area forms a grid of overlapping concentric range rings. Signal processing will place detected sonar targets in one of these grid locations. The targets will be tracked as they move from one grid location to the next. Intruder identification will be determined based on the target signal amplitude and its movement pattern.

Different species of marine life have vastly different patterns of swimming behavior. Many large fish sit motionless for significant periods of time before slowly moving to a new location. Dolphins tend to move at a fairly constant speed and in a straight line as they migrate from one location to another. Sharks tend to constantly move and change directions often as they hunt for food. Boats and swimmers have other very different long term movement patterns.

As new targets enter the surveillance area, they will be tracked and identified by their movement patterns over a period of time. In this way, only threatening targets that approach the swimming area will cause an alert to be sounded.

This same technique of threat assessment can be implemented in other intruder applications, as for example, airport surveillance. In that application, vehicle traffic on runways and particular roads could be ignored while alerts could be issued for pedestrian traffic in these areas or for any traffic in other restricted areas. Again, since each target is tracked and its movement pattern analyzed, particular types of intruders or intruders in particular locations can be ignored.

DETAILED DESCRIPTION OF THE PREFERRED EMBODIMENTS

The goal of the present invention is to provide a simple means of detecting, tracking, and identifying intrusion targets by using non-scanning radar or sonar techniques.

Figure 1:
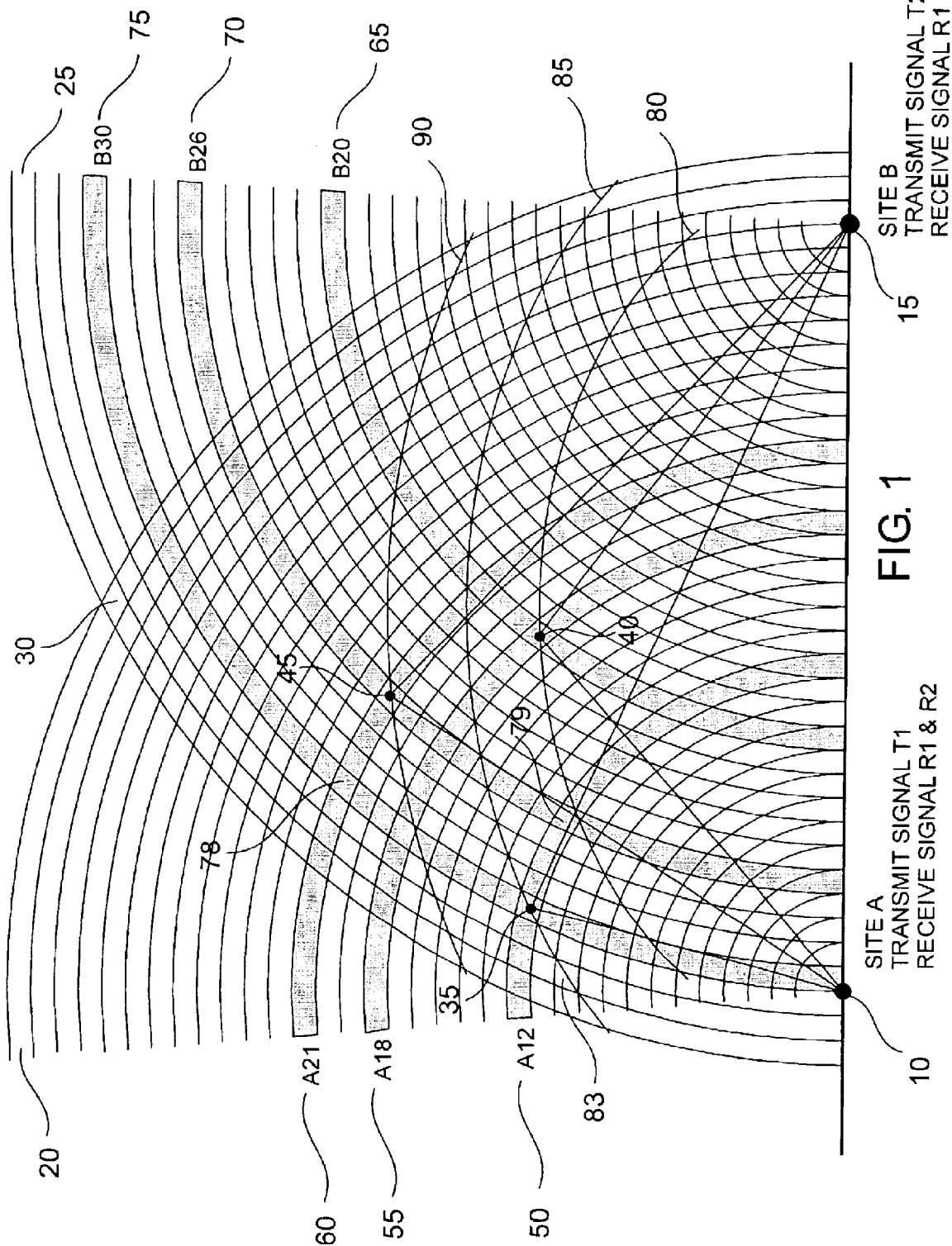
FIG. 1 illustrates the range rings formed by a two antenna or transducer site intruder detection and tracking system, and the reflected signals from multiple targets.

FIG. 1 illustrates a pair of transducer (radar or sonar) sites 10 and 15 illuminating the area under surveillance with electromagnetic or acoustic energy. As is well known to those skilled in the art of radar and sonar, the coverage area in range around each site is divided into a series of concentric range rings 20 from site A and 25 from site B whose width is based on the characteristics of the transmitted signal, the receiver bandwidth, and the signal processing algorithms. Overlapping range rings from site A and site B form a grid pattern 30 that covers the common coverage area.

In FIG. 1, the range rings 20 from site A 10 are labeled in sequence of increasing range as A1, A2, etc. while those 25 from site B 15 are labeled B1, B2, etc. Site A transmits signal T1 and receives its reflected signal R1 while site B transmits a similar, but different signal T2 and receives its reflected signal R2. The receivers at both sites can also receive direct and reflected signals from the adjacent site. Three targets 35, 40, and 45 are present in the FIG. 1 example as illustrated by the round dots.

Figure 2:
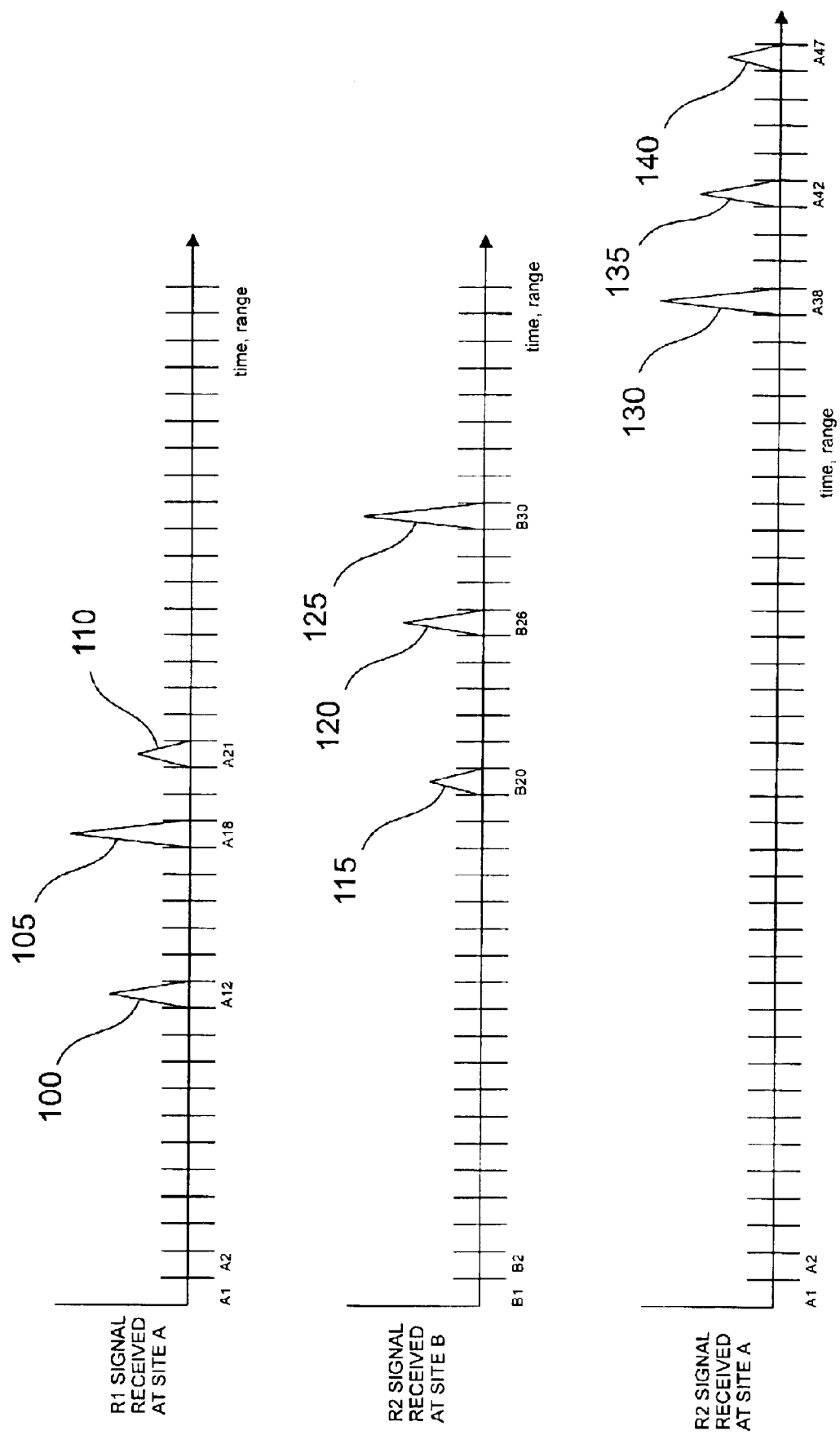
FIG. 2 illustrates the reflected signals obtained as a function of time and range at each of the two sites.

FIG. 2 illustrates the reflected signals obtained at each site. Since no azimuth information is available, only the time of the reflected target signal, with respect to zero range time, is available at each site. Knowing the propagation velocity of the medium allows the target range to be determined as is well known. Target 35 reflects transmitted signal T1 from site A to form a R1 reflected signal 100 at site A. Likewise, targets 40 and 45 form reflected signals 105 and 110 respectively. Reflected signals 100, 105, and 110 occur at range rings A12 50, A18 55, and A21 60 respectively. These range rings are shaded in FIG. 1.

In a like manner, targets 40, 45, and 35 reflect transmitted signal T2 from site B to form R2 reflected signals 115, 120, and 125 respectively at site B. These reflected signals occur at range rings B20 65, B26 70, and B30 75 respectively. These range rings are also shaded in FIG. 1.

Since no azimuth information is available from either site, potential target grid locations are indicated by the 9 overlapping shaded grid locations 78. That is, reflection A12 from signal R1 received at site A can be paired with each one of the 3 reflections B20, B26, or B30 from signal R2 received at site B to give 3 potential target locations. Likewise reflections A18 and A21 from signal R1 received at site A can each be paired with the 3 reflections from signal R2 received at site B to give 3 potential target grid locations for A18 and for A21.

As a key element in this invention, the ambiguity is resolved at site A using reflections on signal R2 received at site A. In FIG. 2, the reflection A42 135 on signal R2 received at site A represents the total signal path length from site B, to the site A target 35 at range ring A12, and then to site A. The locus of all path lengths equal to this distance forms an eclipse whose two focal points are centered at sites A and B. This locus of equal path lengths is illustrated in FIG. 1 as an ellipsoid arc 85 through the site A target 35 at range ring A12. Likewise, similar ellipsoid arcs 80 and 90 are drawn through site A targets 40 and 45 at range rings A18 and A21 respectively. Ellipsoid arc target grid locations 83 are those grid locations that contain an ellipsoid arc.

Using this information, the possible target grid locations 79 can only be at the overlapping grid locations that an ellipsoid arc passes through. That is, the potential target grid location 78 at the A21 and B30 intersection cannot be a possible target grid location because no arc passes through this point. The only possible target grid locations in this example, other than the true target locations (35, 40, 50), are at the intersection 79 of range rings A18 and B30 and at the intersection of A12 and B26 because an arc crosses these overlapping grid locations.

Starting with reflection A21 on signal R1 received at site A, it is obvious the true target grid location 45 must be at the intersection of range ring B26 since that is the only A21 range ring intersection containing an ellipsoid arc. Placing the A21 reflection on signal R1 received at site A, at site B range ring B26, eliminates range ring B26 from further consideration. Therefore, reflection A12 on signal R1 received at site A must be from a target 35 at the intersection of range ring B30 because once range ring B26 is removed from consideration, that is the only intersection containing an ellipsoid arc. Likewise, since range ring B30 is now removed from consideration, the reflection A18 on signal R1 received at site A must be from a target 40 at the intersection of range ring B20.

Starting at site B and performing the same analysis on reflections B20, B26, and B30 using signals R1 and R2 received at site B leads to the same results. Therefore, it is only necessary to perform the analysis at either site A or site B. However, performing the calculations at both sites and comparing the results provides a higher confidence factor since the local noise environment may occasionally corrupt a signal at one site but not the other. Only entering targets into the "located list" when their locations calculated at both sites match will help prevent location errors.

If a great many targets are present, it is possible that too many ambiguities may exist at initial system turn on to resolve all target locations in a single processing cycle. However, since targets of interest will be constantly moving, whenever a non-resolved target moves to an unambiguous location, its true location will be identified. Once a target location is identified, that target will be tracked thus forever removing it from the list of ambiguous targets. In time, all targets will be tracked so that new targets will be easy to locate.

Although many different transmitter waveforms could be used, the most appropriate waveform for this intrusion application is the binary phase coded pulse compression waveform. This waveform consists of a long or CW pulse in which the phase of the carrier is randomly modulated by 0 or 180 degrees at a rate much lower than the carrier frequency. It is also known as a spread spectrum signal or a pseudo random noise (PN) code signal. It is used extensively in communication, radar, and sonar applications and in the Global Positioning System (GPS). Its characteristics are well known to anyone skilled in the art.

One of its most useful characteristics is that different PN code sequences can be assigned to different transmitters so that all transmitters can share the same spectrum. This is what is done in the GPS application where all satellites transmit on the same frequency yet don't interfere with each other because they all use a different PN code.

Each transmitter in the intrusion array described here will be identical except for the PN code used. Not only does this allow common hardware to be used for all sites, but more importantly, it ensures that the propagation path delay for signals from site A are identical to those from site B in an underwater sonar application. Since the signals and their spectrums are both identical, target ranges based on time delays from reflected signals received at site A and site B will correlate exactly with path lengths based on time delays of site A transmitted signals received at site B and vice versa. This ensures that the ellipsoid arcs exactly coincide with target locations based on intersecting grid locations.

A second important characteristic of the PN coded signal is the shape of its ambiguity diagram. The ambiguity diagram represents the response of the receiver matched filter to the signal for which it is match as well as to time shifted (range shifted) and frequency shifted (doppler shifted) mismatched signals. The ambiguity diagram is well known to radar and sonar engineers and is one of the primary design considerations in signal selection.

Figure 3:
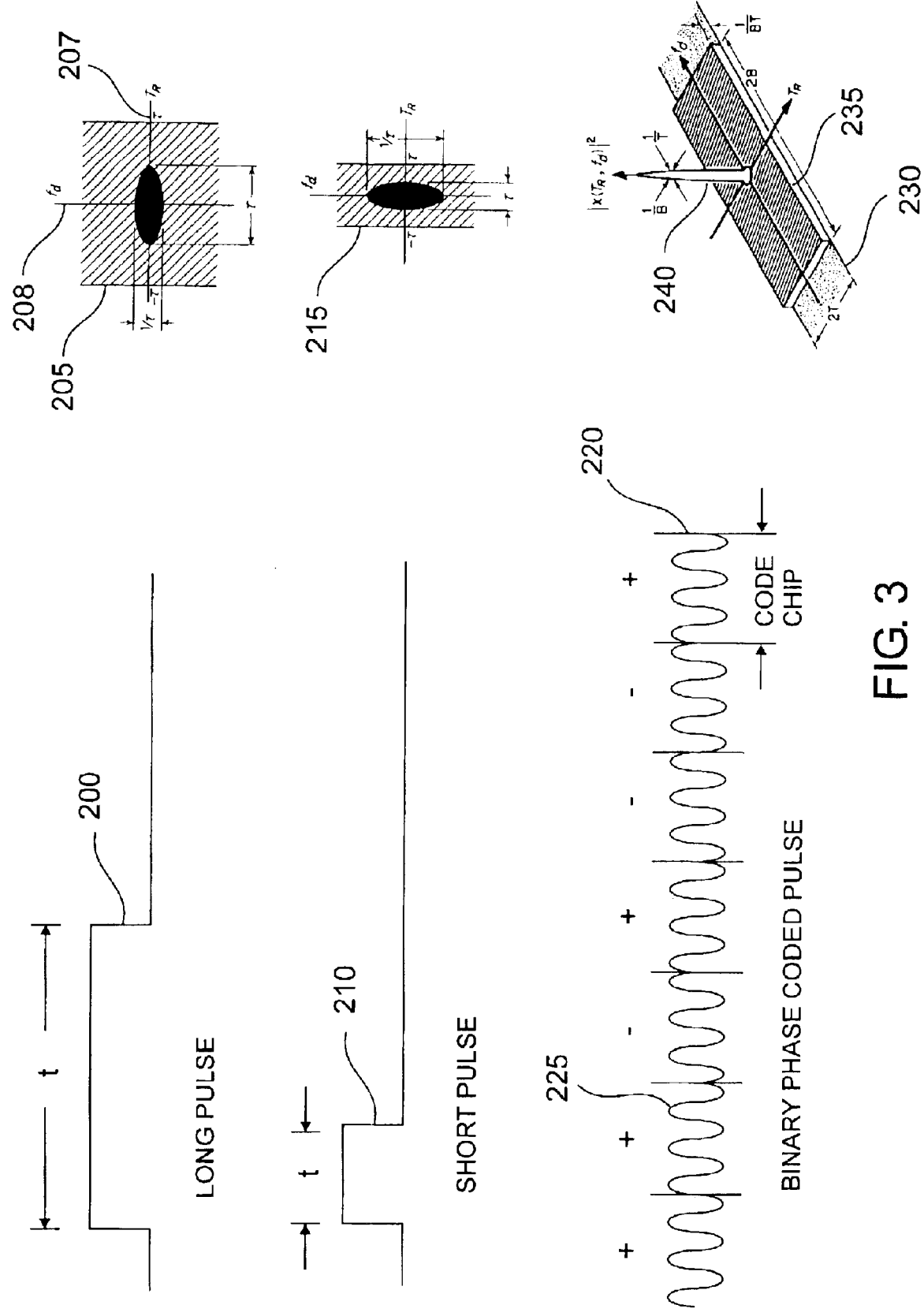
FIG. 3 illustrates the waveform and ambiguity diagram for a long, short and binary phase coded pulse transmission signal.

FIG. 3 illustrates the ambiguity diagram for a long, short, and binary phase coded pulse. For the long and short pulse, FIG. 3 illustrates the ambiguity function as a two dimensional footprint on a time and frequency diagram. For a long pulse 200, the ambiguity function 205 is wide along the time shift (range) axis 207 and short along the frequency shift (doppler) axis 208. This shape indicates that the long pulse has poor time (range) accuracy but high frequency (doppler) accuracy. This means that the matched filter output will still be present as the target range varies slightly so the precise range of the target cannot be determined with great certainty. However, very little doppler shift is required before the matched filter will not respond to the shifted signal at all. Therefore, precise doppler rate measurements can be made on the target by using a bank of matched filters in which each filter in the bank is matched to a different doppler shift.

For the short pulse 210, the opposite is true. A short pulse has high range accuracy but poor doppler accuracy as noted by the narrow width of the ambiguity diagram 215 along the time (range) axis but wide width along the frequency (doppler) axis.

A short binary phase coded pulse 220 containing 6 phase chips 225 (N=6), with code sequence + + − + − − +, is illustrated in FIG. 3. The ambiguity function 230 for a long binary phase coded pulse (N>100) approaches a thumbtack shape in which a broad plateau 235 surrounds the spike 240 at zero range time offset and zero doppler frequency offset. When a reflected signal from a stationary target is passed through its matched filter, an output pulse N times greater in power is obtained at the instant that represents its range, than is obtained at any other instant, where N is the number of binary phase coded chips used in the code sequence.

If the target is moving, the reflected signal is doppler shifted along the frequency axis and the matched filter doesn't respond to it. To receive a doppler shifted signal, a bank of matched filters must be used in which each filter is matched to the particular doppler frequency shifted signal of interest.

This matched filter immunity to doppler shifted signals is useful in this intrusion application because it allows the signals from multiple targets at the same range to be separated. Since no azimuth information is present at each site in this non-scanning implementation, the reflected signals from all targets at the same range appear in the same range ring at the same instant of time. However, by using binary phase coded signals and a bank of doppler shifted matched filters, reflected signals from targets with different radial velocities will appear on separate matched filter outputs and thus can be separated.

Figure 4:
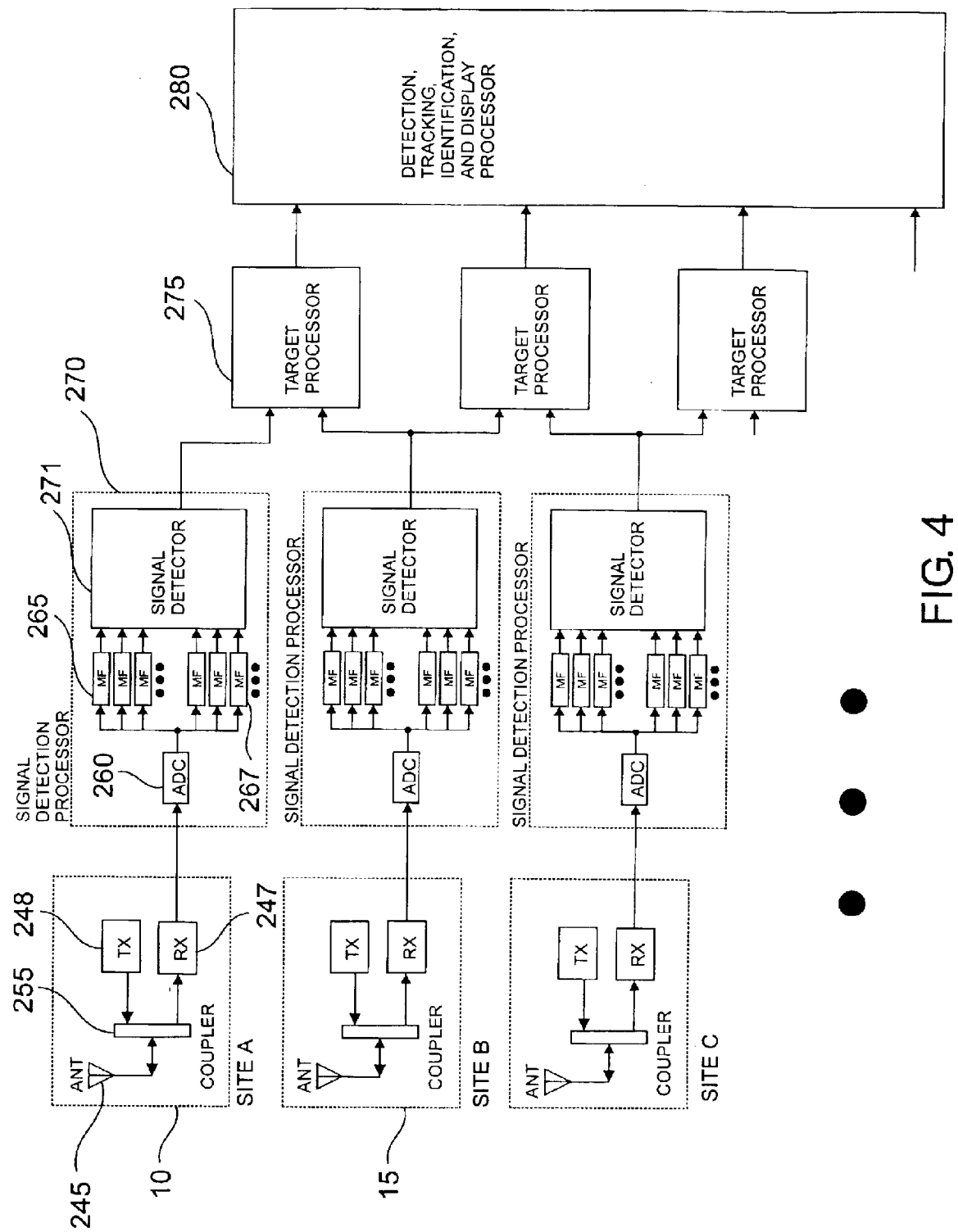
FIG. 4 illustrates a conceptual block diagram of the intruder detection, tracking, and identification system.

FIG. 4 is a conceptual block diagram of the proposed system. At each transducer (radar or sonar) site, the output signal from the acoustic transducer or antenna 245 is amplified and band pass filtered in receiver 247 to remove extraneous noise outside the transmitter 248 signal's bandwidth. A hybrid coupler (power splitter or directional coupler) 255, to separate the transmitted and received signals, is illustrated in this implementation so that a single transducer can be used for both transmitting and receiving. However, separate receiving and transmitting transducers can also be used.

The analog signal is digitized using the analog-to-digital converter (ADC) 260 and processed by 2 banks of digital matched filters (MF) 265 and 267 in signal detection processor 270. Each filter in one bank is matched to a different doppler shifted version of the transmitted signal from site 10. Each filter in the other bank is matched to a different doppler shifted version of the transmitted signal from site 15. As is well known to those skilled in the art, the filter in the bank that is most closely matched to the doppler shifted signal will have the largest output for that signal. Therefore, targets in the same range ring, but moving at different radial velocities, will appear as separate signals because they will each appear at the output of a different matched filter.

The signal detector 271 will pass the range, amplitude, and velocity parameters of each detected signal to the target processor 275. The target processor 275 will use the detected signal information from two adjacent sites to detect potential, ellipsoid, and possible target grid locations using the overlapping grid and ellipse arc technique that was illustrated in FIG. 1.

The final detection, tracking, identification, and display processor block 280 in FIG. 4 determines true target grid locations and will detect and track targets as they move within and between true target grid locations. It will also identify the type of intruder by comparing its signal amplitude and movement pattern to known intruder type characteristics. Threatening targets will be displayed and an alert sounded if they approach the protected area.

The illustration of range rings, eclipse arcs, and processing blocks is for clarification of the principles by which this invention can detect, track, and identify intruders. In an actual implementation, the processing tasks may all reside in common hardware in the form of various software modules because once the site signals are digitized, the implementation is basically a software task. Not illustrated in FIG. 4 are the timing details required to lock the transmitters and the receivers of the sites together. The details of this timing coordination will vary, depending on the system application (radar or sonar), and various methods of providing this coordination can easily be implemented by anyone skilled in the art.

Figure 5:
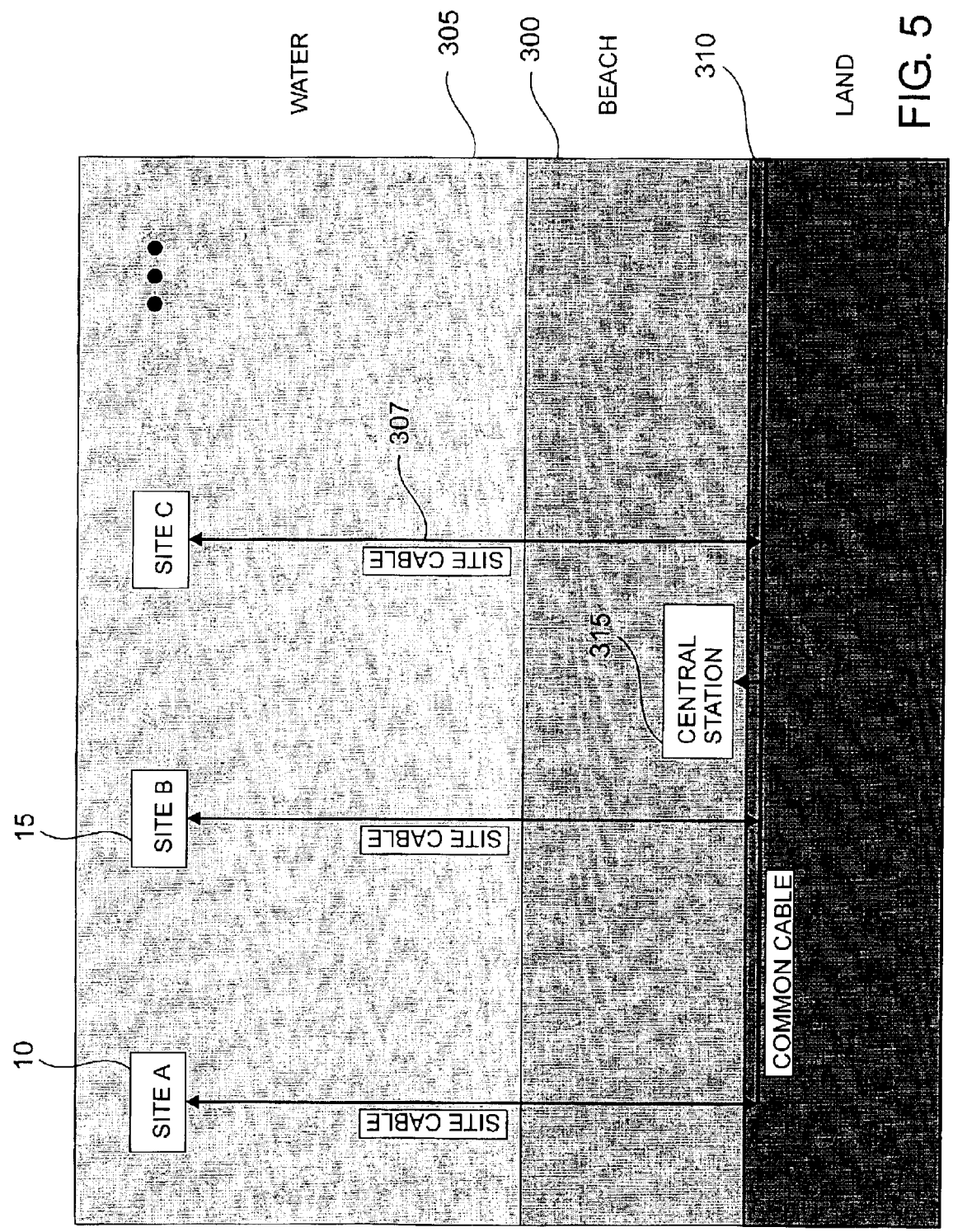
FIG. 5 illustrates the subject invention applied to a shark detection application along a beach.

FIG. 5 illustrates how the described system might be implemented at a beach for shark detection. A series of transducer sites A 10, B 15, C, etc. would be placed offshore in a line parallel to the beach, just outside the swimming area 305, and separated from each other on the order of 1000 feet. A combined power and communication cable 307 from each site would be buried in the sea floor and trenched across the beach 300, so as to connect it to a common cable 310 from the central station 315. Multiplexing or digital networking would be implemented on the common cable so that a single cable could service all the transducer sites in the system. The central station might be the main lifeguard station for the beach.

Figure 6:
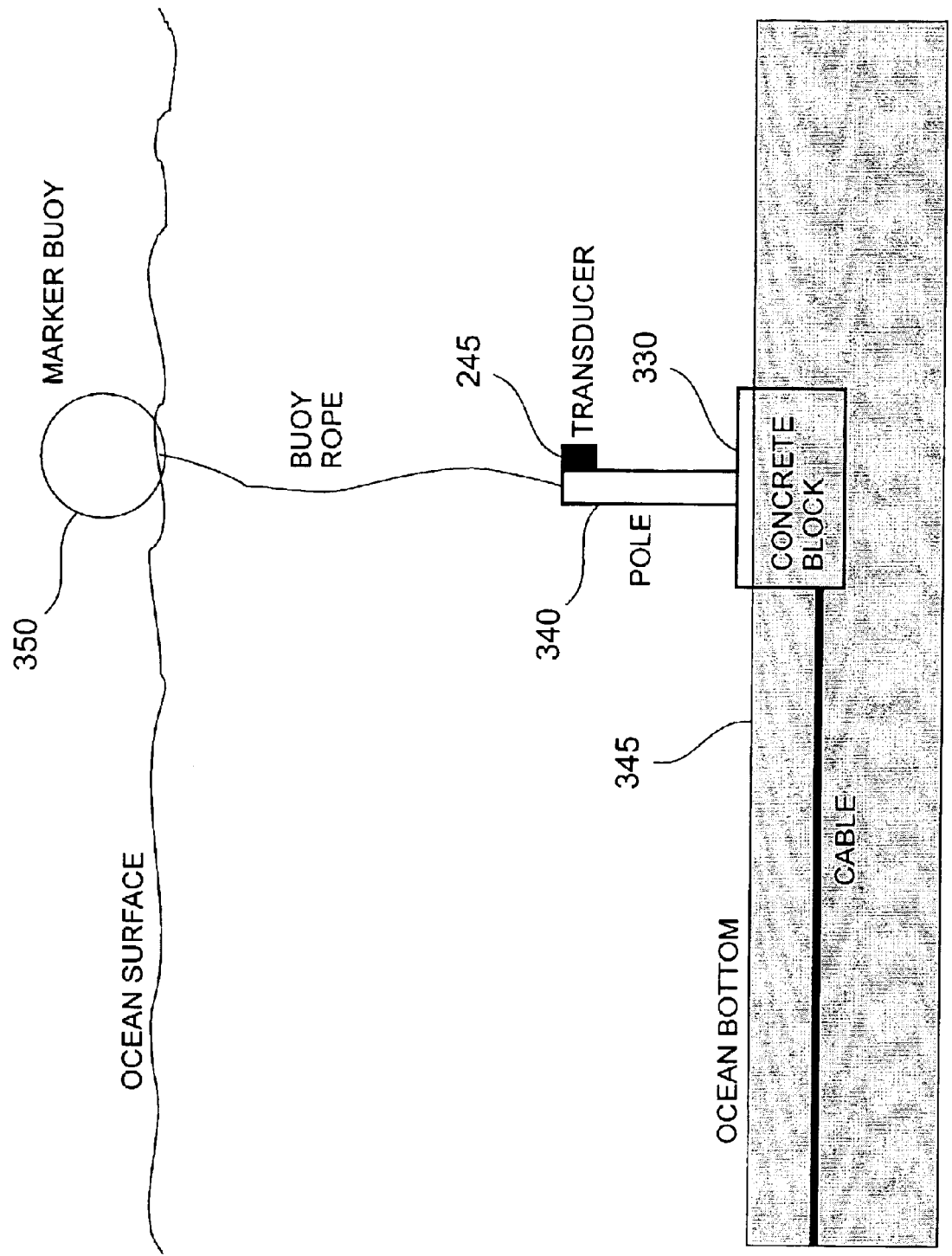
FIG. 6 illustrates the placement of the sensor sites used in the beach shark detection system of FIG. 5.

FIG. 6 illustrates a possible implementation of the transducer sites in which a heavy concrete block 330 is placed on or buried in the ocean floor 345 and the transducer 245 is mounted on a rigid pole 340 embedded in the concrete block. This arrangement insures the transducer is stationary and elevates it above the ocean floor. A marker buoy 350 may be desired to provide a visual indication of transducer sites. These buoys could even be equipped with warning lights and audible alarms so that the buoy closest to the intruder could be activated to indicate the general area of a detected threat.

This beach shark detection system is not limited to simply monitoring the area out to sea beyond the swimming area. The swimming area itself can also be monitored by implementing another transmitting and receiving transducer, or transducers, that look towards the beach instead of out to sea. Alternatively, transducers with a 360 degree azimuth beamwidth, instead of 180 degrees, could be used so as to monitor both the area away from the beach and towards the beach. However, this arrangement leads to a further target ambiguity in that each pair of adjacent sites cannot determine if the target is towards the ocean or towards the beach. The tracking processor would have to resolve the ambiguity using the fact that sharks cannot originate from shore. That is, using the fact that any new shark targets must be coming in from the direction of the ocean resolves the ambiguity.

For shark detection along a beach or for area surveillance at an airport, the surveillance area is basically two dimensional. That is, the water depth just outside a beach swimming area is typically only a dozen or so feet deep. Likewise, the vertical extent of an airport surveillance area is also only a few dozen feet high. Therefore, a very narrow elevation beamwidth can be used in the sonar transducers or the radar antennas which provides considerable power gain in the direction of interest.

Figure 7:
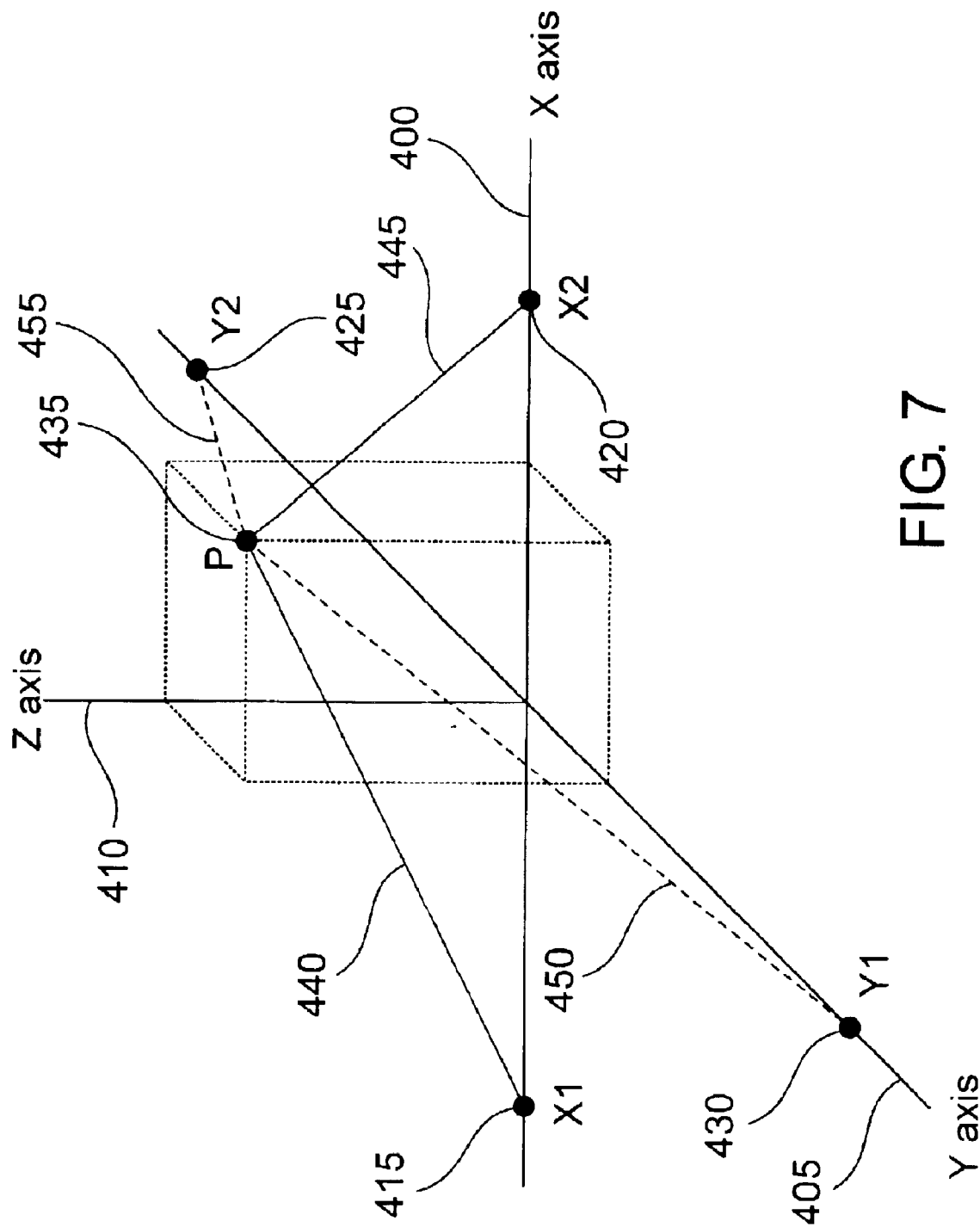
FIG. 7 illustrates the application of the subject invention to a 3-dimensional surveillance area.

However, this invention is not limited to only a two dimensional surveillance area. FIG. 7 illustrates an arrangement of 4 sites that could be used to form a three dimensional intruder surveillance area above the sites. In FIG. 7, the X axis 400 and Y axis 405 are laid out on the ground at right angles to each other. The Z axis 410 represents height above the ground.

Assume that the two sites X1 415 and X2 420 are placed along the X axis in the same manner as was illustrated in FIG. 1. However, this time assume that the transducers or antennas are implemented to have a hemispherical beamwidth. That is, they cover 360 degrees in the X,Y azimuth plane and 180 degrees in elevation Z.

With this broad elevation beamwidth, the two dimensional azimuth range rings centered at each site, that were illustrated in FIG. 1, will now be rotated about the X axis in elevation to form range hemispheres centered at each site. That is, just as all targets situated within any range ring appeared at the same range in the two dimensional system illustrated in FIG. 1, now all targets within any range hemisphere in the three dimensional system will also appear at the same range.

In FIG. 7, sites X1 and X2 process data in the same manner as in the two dimensional system to locate a target in the grid of overlapping range rings and ellipsoid arc. The only difference is that now sites X1 and X2 do not know if the target is situated on the ground in the direction of site Y2 425, as it would have been in the two dimensional system illustrated in FIG. 1, or if the target is situated on the ground in the direction of site Y1 430, or if the target is at some elevation angle above the ground. This direction and elevation ambiguity is resolved using sites Y1 and Y2.

FIG. 7 illustrates a target P 435 situated above the ground. The solid line from X1 to P 440 and P to X2 445 is the direct reflected path of a signal transmitted from site X1 and received by site X2 or vice versa. Not shown are the overlapping range ring grid pattern and ellipsoid arc illustrated in the two dimensional system of FIG. 1. In this three dimensional system, the range rings and ellipsoid arc will have been rotated about the X axis so that their intersection point passes through the target at point P. Although not illustrated, as this two dimensional intersection point is rotated about the X axis, it traces out a semicircle on a Y,Z plane situated at point P.

In a like manner, direct path 450 and 455 from sites Y1 and Y2 form an intersection of its two dimensional range rings and an ellipsoid arc which is then rotated about the Y axis so that its intersection point passes through point P. Again, the rotation of this two dimensional intersection point about the Y axis traces out a semicircle on a X,Z plane situated at point P.

The true target location is determined by the intersection of the circle formed by rotating the X1 and X2 site intersection point about the X axis with the circle formed by rotating the Y1 and Y2 site intersection point about the Y axis. In a multiple target situation, many of these semicircles will be present on YZ and XZ planes situated at various locations along the X axis and the Y axis respectively. In the three dimensional system, the target processor will use the detected signal information from all four sites to detect, locate, and track individual targets using these overlapping semicircles.

Note that in the two site two dimensional system illustrated in FIG. 1, targets do not have to be between site A and site B to be accurately located. The overlapping range ring grid system extends well beyond the site ends. As long as significant reflected signal power is received by both sites, the target can be placed within a pair of overlapping range rings and accurately located. The same is true in a three dimensional system.

Figure 8:
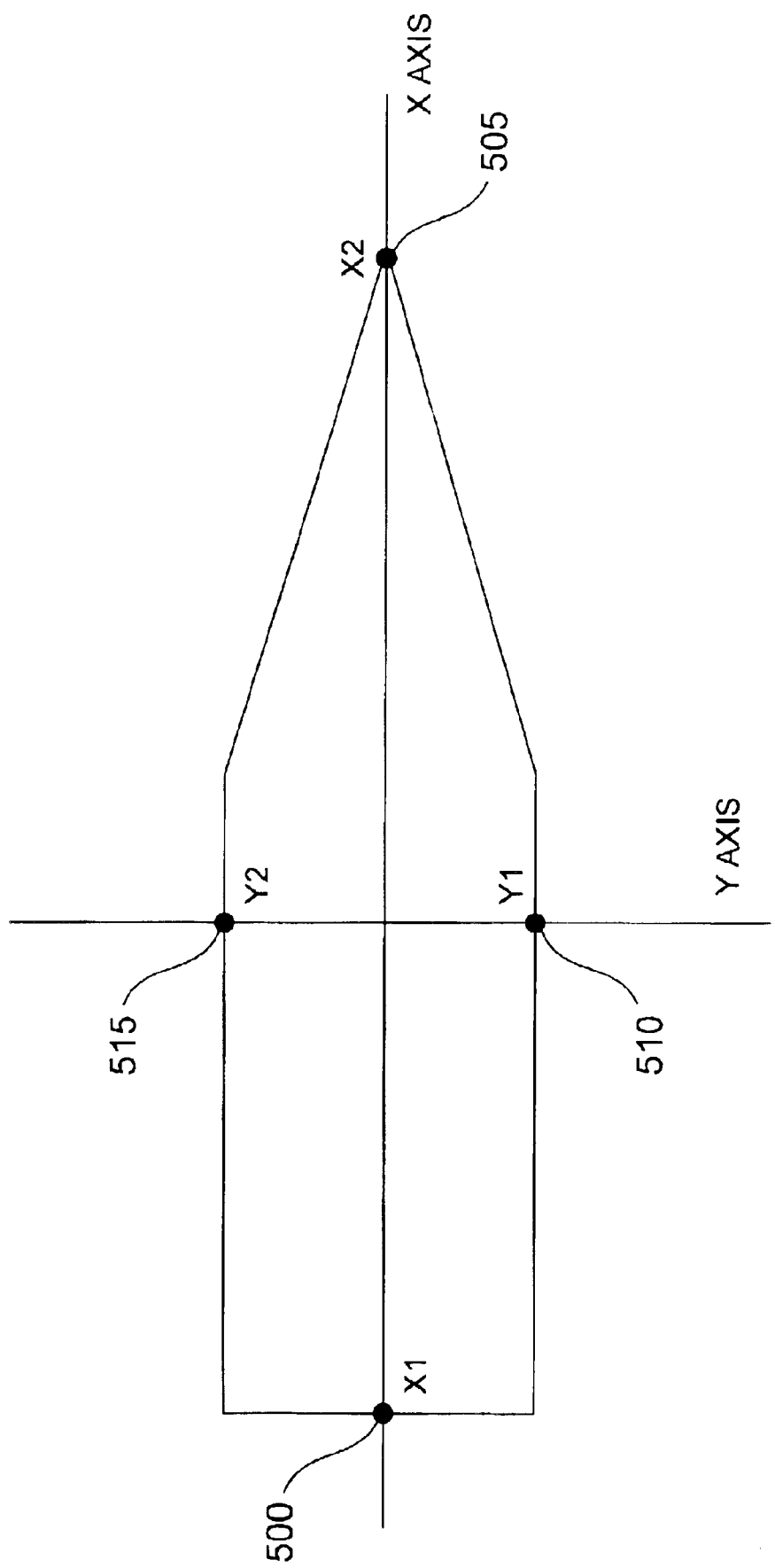
FIG. 8 illustrates the subject invention mounted on a boat for fish finding or other applications.

The three dimensional locating ability and the fact that targets do not have to be between the sites allows this invention to be also used on boats for fish finding and for shark detection in scuba diving applications. FIG. 8 illustrates how the four sites could be situated around the peripheral of the boat to form a three dimensional surveillance area below the boat. Site X1 500 is mounted on the stern and site X2 505 is mounted on the bow. Sites Y1 510 and Y2 515 are mounted on the starboard and port sides respectively. The volume of the hemispherical coverage area below the boat will increase as the depth of the water increases. In deep water, a large fish finding or monitored scuba diving area will be formed that extends to the ocean floor.

The location of the boat sites are rigid since they are attached to the boat. However, as the boat pitches and rolls on the surface, all the targets will appear to be randomly moving in unison within the coverage area. It may therefore be necessary or desirable to transform the indicated target locations, calculated with respect to the instantaneous attitude of the boat, to their true locations with respect to a stabilized boat.

These stabilization corrections can either be determined using inputs from a reference gyro or by using display pattern matching techniques based on stable bottom features. That is, display corrections would be applied to all the targets such that any bottom feature would remain stationary. The gyro technique is preferred, however, since the bottom may not be visible in a very deep water fishing application.

As is well known by those skilled in the art, the desired detection sensitivity, range resolution, tracking performance, and target identification accuracy can be varied over a wide range of values by the proper selection of carrier frequency, modulation bandwidth, signal power, PN code length, and antenna or transducer beam widths. Each particular application will involve selections and tradeoffs between these parameters to optimize performance and minimize overall system cost as is well known by any practicing radar or sonar engineer.

The binary phase coded thumbtack ambiguity diagram is an ideal that can be approached but never achieved. In reality, a doppler shifted reflected signal will produce extraneous responses from some of the doppler matched filters other than the filter to which it is matched. However these extraneous responses can be minimized by good code selection and their effect minimized with good tracking algorithms. Since these extraneous responses come and go at random, while true target responses persist, over time the tracking algorithms will weed out the bogus targets and track only the true targets.

In the two dimensional system, each site receives the signal transmitted by the adjacent sites. The closest (and strongest) signal received from an adjacent site represents the separation between the sites. This information makes the system self calibrating and extremely accurate. The sites can be installed where ever required without regard to precision placement and the system will automatically determine their actual separation. In the three dimensional system, each site will be equipped to receive the signals from each of the 3 other sites so that the true separation of the sites can also be automatically determined.

The method and preferred embodiments of the invention have been illustrated and described in detail. However, it will be readily apparent to those skilled in the art that various modifications may be made therein without departing from the spirit of the invention. For example, the three dimensional system can also be implemented using 3 sites arranged in the form of a triangle. This arrangement forms 3 pairs of adjacent sites corresponding to the three legs of the triangle. Each pair of sites produces a semicircle on a plane perpendicular to its leg as the intersection point of its range rings and ellipse arc is rotated about its leg axis as previously described. The intersection of the 3 semicircles, formed by the rotation of each of the 3 pairs of sites about their axis, represents the true position of the target.

Many other applications of this invention are also possible. For example, a triangle of 3 sites could be mounted with wide spacing on the ocean floor around a popular dive area to form a three dimensional surveillance area from the ocean floor up to the surface for the protection of scuba divers. Alternatively, the sites could be anchored just below the surface, to minimize movement due to wave action, so as to form a surveillance area from the surface down to the ocean bottom. In Florida, this intruder system could be implemented on a busy waterway to automatically issue warnings to boaters if manatees were present. Florida has made many areas restricted speed zones, slowing down commerce, in an attempt to cut down on injuries to manatees by boaters. Using this invention, the speed restrictions need only be activated when manatees are present.

Finally, a three or four site system could be placed at widely separated ground locations to implement a three dimensional radar for detecting airborne intruders. As long as all sites had a common view of the desired coverage area, both the location and altitude of airborne targets could be determined and tracked.

What is claimed is:

1. A method for detecting, an intruder within a surveillance area, said method comprising:

transmitting a first signal toward said surveillance area from a first non-scanning transducer site at a first location;

transmitting a second signal toward said surveillance area from a second non-scanning transducer site at a second location;

receiving, at said first non-scanning transducer site, a first reflected signal of said first signal reflected from said intruder;

receiving, at said second non-scanning transducer site, a second reflected signal of said second signal reflected from said intruder;

receiving, at said second non-scanning transducer site, a third reflected signal of said first signal reflected from said intruder; and determining a position of said intruder within said surveillance area in response to said first, second, and third reflected signals.

2. A method as claimed in claim 1 wherein said determining activity comprises:

establishing first range rings around said first non-scanning transducer site at said first location;

establishing second range rings around said second non-scanning transducer site at said second location;

identifying one of said first range rings from which said first reflected signal occurs;

identifying one of said second range rings from which said second reflected signal occurs;

establishing an ellipsoid arc having foci centered at said first and second locations; and determining said position of said intruder as being a coincident locality of said ones of said first and second range rings and said ellipsoid arc.

3. A method as claimed in claim 1 wherein said position is a first position, and said method further comprises tracking movement of said intruder in said surveillance area, said tracking activity including:

receiving, at said first non-scanning transducer, a fourth reflected signal of said first signal;

receiving, at said second non-scanning transducer, a fifth reflected signal of said second signal;

receiving, at said second non-scanning transducer, a sixth reflected signal of said first signal;

determining a second position of said intruder in said surveillance area in response to said fourth, fifth, and sixth reflected signals;

recording a time history of intruder movements within said surveillance area in response to said first and second positions; and displaying said time history of said intruder movements on a display.

4. A method as claimed in claim 3 further comprising identifying an intruder type for said intruder, said identifying operation including:
comparing said intruder movements to intruder movement patterns for a plurality of intruder types stored in a data base; and
associating said intruder with one of said intruder types based on a similarity of said intruder movements and one of said intruder movement patterns stored in said data base.

5. A method for detecting a position of an intruder within a three dimensional surveillance area, said method comprising:
transmitting a first signal toward said three dimensional surveillance area from a first non-scanning transducer site at a first location;
transmitting a second signal toward said three dimensional surveillance area from a second non-scanning transducer site at a second location;
transmitting a third signal toward said three dimensional surveillance area from a third non-scanning transducer site at a third location;
receiving, at said first transducer site, a first reflected signal of said first signal reflected from said intruder;
receiving, at said second transducer site, a second reflected signal of said second signal reflected from said intruder;
receiving, at said third transducer site, a third reflected signal of said third signal reflected from said intruder;
receiving, at said third transducer site, a fourth reflected signal of said second signal reflected from said intruder; and
determining said position of said intruder within said three dimensional surveillance area in response to said first, second, third, and fourth reflected signals.

6. A method as claimed in claim 5 additionally comprising:
transmitting a fourth signal toward said three dimensional surveillance area from a forth non-scanning transducer site at a forth location;
situating said first and second locations along a first axis through a point and approximately equidistant from said point;
situating said third and forth locations along a second axis through a point and approximately equidistant from said point; and
orienting said first and second axes at right angles to each other.

7. A system for detecting a position of an intruder within a surveillance area, said system comprising:
a first transducer site at a first location, said first transducer site transmitting a first signal within a first coverage area, and said first transducer site receiving a first reflected signal of said first signal reflected from said intruder;
a second transducer site at a second location, said second transducer site transmitting a second signal within a second coverage area, said second coverage area partially overlapping said first coverage area to yield a common coverage area, said second transducer site receiving a second reflected signal of said second signal reflected from said intruder and a third reflected signal of said first signal reflected from said intruder; and
a processor in communication with said first and second transducer sites for receiving said first, second, and third reflected signals and determining said position of said intruder in said common coverage area in response to said first, second, and third reflected signals.

8. A system as claimed in claim 7 wherein each of said first and second transducer sites comprises a non-scanning transducer.

9. A system as claimed in claim 7 wherein each of said first and second transducer sites comprises an underwater acoustic transducer.

10. A system as claimed in claim 7 if wherein said first coverage area is defined by first range rings, said second coverage area is defined by second range rings, and said processor comprises:
a first signal detection processor in communication with said first transducer site for identifying one of said first range rings from which said first reflected signal occurs;
a second signal detection processor in communication with said second transducer site for identifying one of said second range rings from which said second reflected signal occurs; and
a target processor in communication with said first and second signal detection processors, said target processor utilizing said third reflected signal to establish an ellipsoid arc having foci centered at said first and second locations, and said target processor determining said position of said intruder as being a coincident locality of said ones of said first and second range rings and said ellipsoid arc.

11. A system as claimed in claim 10 wherein said second signal detection processor comprises:
a first bank of matched filters, each of said matched filters being matched to a Doppler shifted version of said second signal; and
a second bank of matched filters, each of said matched filters being matched to a Doppler shifted version of said first signal.

12. A system as claimed in claim 7 wherein:
said first transducer site is configured to receive a fourth reflected signal of said first signal;
said second transducer site is configured to receive a fifth reflected signal of said second signal and a sixth reflected signal of said first signal; and
said processor receives said fourth, fifth, and sixth reflected signals and determines a second position of said intruder to track movement of said intruder in said common coverage area in response to said fourth, fifth, and sixth reflected signals.

13. A system as claimed in claim 12 wherein said processor identifies an intruder type in response to said first and second positions of said intruder.

14. A system as claimed in claim 7 wherein:
said first transducer site is configured to receive a fourth reflected signal of said first signal reflected from a second intruder, said second intruder being within said common coverage area concurrently with said first intruder;
said second transducer site is configured to receive a fifth reflected signal of said second signal reflected from said second intruder and a sixth reflected signal of said first signal reflected from said second intruder; and said processor receives said fourth, fifth, and sixth reflected signals to determine a second position of said second intruder in said common coverage area.

15. A system as claimed in claim 14 wherein said first coverage area is defined by first range rings, said second coverage area is defined by second range rings, and said processor comprises:
- a first signal detection processor in communication with said first transducer site for identifying ones of said first range rings from which said first and fourth reflected signals occur;
- a second signal detection processor in communication with said second transducer site for identifying ones of said second range rings from which said second and fifth reflected signals occur; and
- a target processor in communication with said first and second signal detection processors, said target processor utilizing said third reflected signal to establish a first ellipsoid arc, said target processor utilizing said sixth reflected signal to establish a second ellipsoid arc, said first and second ellipsoid arcs having foci centered at said first and second locations, said target processor determining said position of said intruder as being a first coincident locality of identified ones of said first and second range rings and said first ellipsoid arc, and said target processor determining said second position of said second intruder as being a second coincident locality of other identified ones of said first and second range rings and said second ellipsoid arc.

16. A system as claimed in claim 15 wherein said first and second signal detection processors identify at least three of said first and second range rings.

17. A system as claimed in claim 15 wherein a grid pattern is formed by overlapping said first and second range rings in said common coverage area, and said target processor detects potential target grid locations as grid locations in said grid pattern at which said identified ones of said first and second range rings overlap.

18. A system as claimed in claim 17 wherein said target processor detects ellipsoid grid locations as those of said grid locations that contain one of said first and second ellipsoid arcs.

19. A system as claimed in claim 18 further comprising an outcome processor in communication with said target processor, said outcome processor utilizing said potential target grid locations and said ellipsoid grid locations to identify a first one of said grid locations as said first coincident locality and a second one of said grid locations as said second coincident locality.

20. A system as claimed in claim 7 further comprising a third transducer site at a third location and in communication with said processor, said third transducer site transmitting a third signal within a third coverage area, said third coverage area partially overlapping said common coverage area to yield a volumetric common coverage area, and said third transducer site receiving a fourth reflected signal of said third signal reflected from said intruder, said processor receiving said fourth reflected signal and determining said position of said intruder in said volumetric common coverage area in response to said first, second, third, and fourth reflected signals.

* * * * *